Jan. 1, 1952  H. S. PERLMAN  2,580,698
ELECTRIC HOT PLATE
Filed Oct. 22, 1949
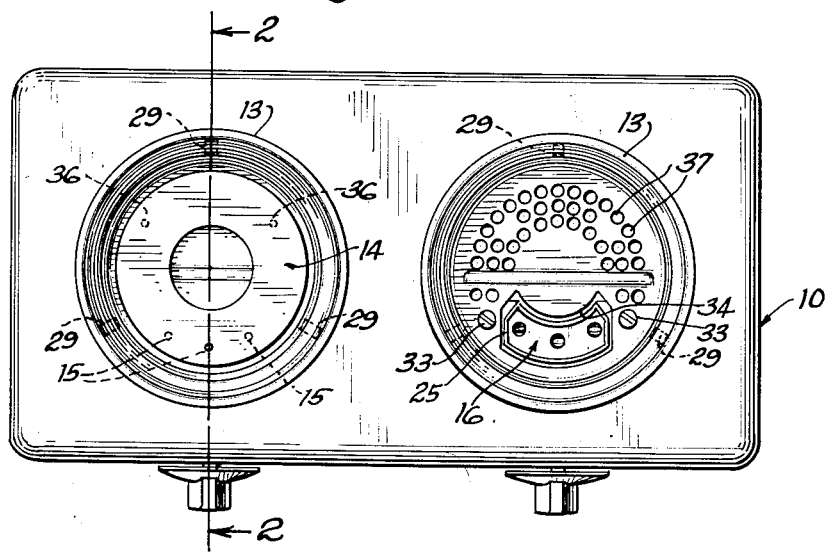
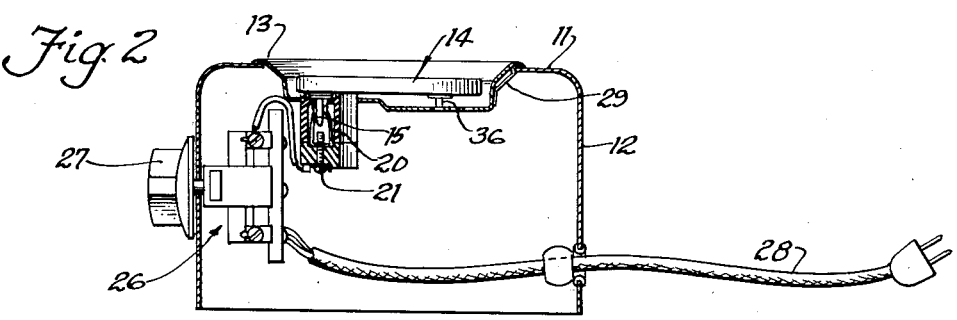
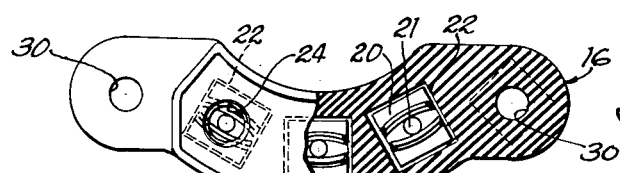
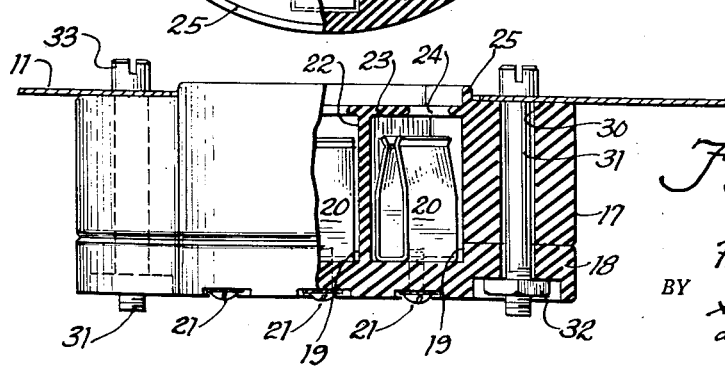
INVENTOR.
Henry S. Perlman
BY Sheridan, Davis
and Cargill
Attys Patented Jan. 1, 1952

2,580,698

UNITED STATES PATENT OFFICE 2,580,698

ELECTRIC HOT PLATE

Henry S. Perlman, Chicago, Ill., assignor, by mesne assignments, to Henry S. Perlman and Paul E. Perlman, doing business as Hill-Shaw Company, Chicago, Ill., a copartnership Application October 22, 1949, Serial No. 122,989

1 Claim. (Cl. 219—37)

This invention relates to improvements in electric hot plates.

One object of the invention is to provide an improved structure for the support of plug-in type heating elements and the outlets therefore for electrical hot plates or stoves.

The electric hot plates of a form in common use in homes and restaurants for example, are provided with sheet metal casings which support the heating elements. Where such hot plates utilize plug-in heating elements, the casing provides the ultimate support for the elements. In pressing the terminals of such heating elements into, or in removing them from, the outlet, it is desirable that any resulting deflection of the sheet metal support shall not cause an increase in the original minimum spacing of certain parts that constitute a safety factor against contact of the terminals with the fingers of the operator, which might result in electrical shock or burns where replacement of a heating element is effected without first turning the switch to an "off" position. Hence, it is another object of the invention to provide a structure whereby the electrical outlet of the device into which the contacts of the removable element are plugged will always be retained in a fixed position relative to the final operative position of the element.

Other objects of the invention relate to various features of construction and arrangement of parts which will be apparent from a consideration of the following specification and accompanying drawings, wherein:

Figure 1 is a top plan view of a two-burner electrical hot plate which is illustrative of the present improvements, the heating element of the right hand burner being removed.

Fig. 2 is a sectional view taken approximately on the line 2—2 of Fig. 1.

Fig. 3 is a broken top elevational view of an outlet of a type employed in the illustrated hot plate.

Fig. 4 is a broken elevational view of the insulating receptacle.

In the drawings, the casing of the hot plate, which is preferably formed of sheet metal, is indicated generally by the numeral 10 and comprises, in the form illustrated, a top wall 11 and dependent side and end walls 12. The top wall 11, where the hot plate is of a two-burner type, is provided with two circular openings into which are seated sheet metal cups 13 having flanges that overlie the marginal portions of the top wall adjacent the openings. The cups are of a depth and diameter sufficient to accommodate electrical heating elements indicated generally by the numeral 14. The heating elements shown in the drawing are of annular form and of the enclosed type and are provided with three centrally offset depending contacts 15 inasmuch as the burners afford "high," "medium," and "low" heat. The heating elements sometime burn out in use, making replacement necessary, and in effecting such replacement it is only necessary to pull up on such an element to release the terminals 15 from engagement with cooperating contacts of the receptacle hereafter described, to remove the element and replace it with another. The necessity for calling an electrician for detaching and reattaching conductors to the element thus is avoided by the use of such plug-in heating elements.

A suitable outlet receptacle, one of which is used for each heating element, is shown in Figs. 3 and 4 and is designated generally by the reference numeral 16. The receptacle, in the form illustrated, is formed of an upper section 17 of electrical insulating material, such as porcelain, and a lower section 18. The lower section 18 is provided with recesses 19 in the upper surface thereof within which are seated contacts 20, the latter being secured in place by means of screws 21. Electrical conductors are connected to the contacts by means of the screws 21.

The upper section 17 of the outlet is provided with cells or cavities 22 which enclose the respective contacts 20. Over the upper ends of the cells is an integral wall 23 provided with openings 24 located axially of each cell and through which the terminals 15 of the element are inserted in making contact with the contacts within the cells.

As shown in Figs. 1, 3, and 4, the upper surface of the section 17 of the outlet is provided with an upstanding flange 25 extending about the three openings 24 and serving partially to close, or to reduce, the vertical space between the upper end of the outlet and the lower surface of the heating element when the latter is in operative position.

The contacts 20 are connected to a switch 26 which is operable by a knob or button 27 located on the forward wall of the casing and, with the form of switch illustrated, is adjustable from an "off" position to any one of three operative positions for giving "high," "medium," or "low" heat. A cord 28 is shown, by means of which the hot plate may be plugged into a wall receptacle or the like.

For the purpose of securing the cups 13 to the casing, each cup is provided with a plurality of spring clips 29 the free upper ends of which engage the margins of the respective openings in the top wall 11 into which the cup is placed. By use of a screw driver or the like, the clips may be sprung to a position for releasing a respective cup from engagement with the casing when it becomes desirable to remove the cup.

Each cup supports one of the receptacles 16 and serves to retain the receptacle always in a fixed position with respect to a heating element 14 within the cup. For attaching a receptacle to a cup, the receptacle is provided with passages 30 for receiving bolts 31, the lower ends of which are provided with nuts 32 and with slotted heads 33 at the upper ends. The bolts 31 thus secure the upper and lower sections 17 and 18 respectively of a receptacle together and likewise secure them to the bottom of the cup. The cups, as shown in Fig. 10, are provided each with a recess or cut-out 34 which are off-set centrally of the respective cups and each is of a configuration corresponding generally to the configurations of the upstanding flange 25 of the receptacle but being somewhat larger in area than the area defined by the flange to provide a space surrounding the flange through which liquid that may be spilled into the cup may drain. It will be noted that in the assembled relationship the flange 25 extends slightly above the upper surface of the bottom of the cup.

The heads 33 of the bolts 31 extend upwardly above the surface of the bottom of the cup to provide stops which limit the downward movement of the element 14 when it is pressed into operative position. The forward portions of each heating element likewise are provided with a pair of downwardly extending studs 36 which contact the bottom of the cup and cooperate with the heads 33 to provide a stable support for a heating element within a cup and which support the element in a position spaced above the bottom of the cup.

By reason of the constructions shown and described, each receptacle 16 is firmly attached to a cup 13 whereby the repeated insertion and removal of elements does not produce a variation in the relative spacing of a receptacle with reference to a cup. The terminals 15 are of sufficient length to make adequate contact with the spring contacts 20 of the receptacle just prior to the seating of the heating element in the operative position shown in Fig. 2. The upstanding wall or flange 25 of the receptacle provides an obstruction or safety wall which prevents the insertion of an operator's fingers into contact with the terminals 15 as the same move into, or before the same have moved out of, electrical contact with the contacts 20, thus providing a safety factor which prevents electrical shock or burns should one attempt to remove or insert a heating element without first turning the switch member 27 to the "off" position. The receptacles being firmly attached to the cup and the latter being attached to the casing, repeated insertion and removal of heating elements from a cup do not, by deflection of the metal parts, change the relative position at which the terminals 15 make contact with the respective contacts.

The receptacles preferably are attached to the portions of the cup adjacent the forward side of the casing as shown in the drawings, since a person in removing or inserting an element naturally grasps the forward portion of the element via the central opening in handling it and thus avoids undue cocking or tilting of the element in moving it from or pressing it into operative position which would tend to spread the cooperating parts of the contacts 20 apart or bend the terminals 15.

The lower portion of the cups as shown in Fig. 1 (see the right hand cup) preferably are provided with a plurality of ventilation openings 37 which permit air to flow upwardly through the cups. This ventilation has been found desirable since it avoids the overheating of the lower portion of the elements and prolongs the period of usefulness thereof.

While I have shown and described a structure which is illustrative of my improvements, various changes in the details may be resorted to without departure from the spirit of the invention set forth in the appended claim.

I claim:

An electrical hot plate comprising a casing provided with a cup accommodating opening in the top wall thereof, a cup seated in said opening provided with a supporting flange overlying the marginal portion of the top wall surrounding the opening and having an aperture in the bottom off-set from the center thereof for accommodating the upper end portion of an outlet receptacle, an outlet receptacle secured to the lower surface of the cup and provided with enclosed contacts and having receiving openings in the upper end thereof for insertion into contact with said contacts of the terminals of an annular plug-in heating element placed within the cup, said receptacle being provided with an upstanding flange surrounding said receiving openings and projecting upwardly through said aperture in the bottom of the cup, an annular plug-in heating element provided with downwardly projecting terminals off-set from the center thereof and adapted for insertion in the receiving openings of said receptacle, the relation of the length of said terminals to said flange being such as to preclude the contact of the fingers of a user with said terminals when the latter are in contact with the contacts of the receptacle in positioning the heating element in or in removing the same from operative position within the cup, means in the cup engaging the heating element adjacent the terminals thereof for limiting downward movement of the element within the cup, and depending studs carried by the heating element for engaging the bottom of the cup at points remote from said stop means and cooperating therewith for supporting the element in stable relation within the cup and in spaced relation with respect to the bottom of the cup to enable the manual grasping of the annular element by insertion of the user's fingers through the central opening of the element for lifting the element from the cup.

HENRY S. PERLMAN.

REFERENCES CITED

The following references are of record in the file of this patent:

UNITED STATES PATENTS

| Number | Name | Date |
| --- | --- | --- |
| 1,029,230 | Russell | June 11, 1912 |
| 1,177,254 | Lawrence | Mar. 28, 1916 |
| 2,486,862 | Meyer | Nov. 1, 1949 |
| 2,496,654 | Alsdorf | Feb. 7, 1950 |

FOREIGN PATENTS

| Number | Country | Date |
| --- | --- | --- |
| 108,727 | Sweden | Oct. 12, 1943 |
| 686,474 | Germany | Jan. 10, 1940 |
| 762,386 | France | Apr. 10, 1934 |